United States Patent [19]

Ivo

[11] Patent Number: 5,098,651
[45] Date of Patent: Mar. 24, 1992

[54] MAGNESIUM TREATMENT PROCESS AND APPARATUS FOR CARRYING OUT THIS PROCESS

[75] Inventor: Henych Ivo, Stetten, Switzerland

[73] Assignee: Georg Fischer AG, Schaffhausen, Switzerland

[21] Appl. No.: 619,043

[22] Filed: Nov. 28, 1990

[30] Foreign Application Priority Data

Nov. 28, 1989 [CH] Switzerland ............ 04258/89

[51] Int. Cl.⁵ .............................. C22C 33/08
[52] U.S. Cl. .................... 420/20; 420/19; 420/21
[58] Field of Search .............. 420/20, 21, 19

[56] References Cited

U.S. PATENT DOCUMENTS

| | | | |
|---|---|---|---|
| 2,776,206 | 1/1957 | Klingbeil | 420/21 |
| 3,295,960 | 1/1967 | Parlee | 420/19 |
| 3,367,646 | 2/1968 | Robertson | 420/19 |
| 3,666,449 | 5/1972 | Alt | 420/20 |
| 3,955,974 | 5/1976 | Alt | 420/20 |
| 3,999,984 | 12/1976 | Kawai | 420/21 |

*Primary Examiner*—Peter D. Rosenberg
*Attorney, Agent, or Firm*—Bachman & LaPointe

[57] ABSTRACT

A magnesium treatment process is proposed for the production of a treated iron melt containing less than 100 grams per ton non-metallic inclusions. The treatment reaction is so arranged that the magnesium is introduced into the melt from a chamber at a depth of at least 200 mm below the surface of the melt. Thus, the quantity of vaporized magnesium produces a mixing energy of at least 1,000 W/m³, which ensures the necessary elimination of non-metallic inclusions. The surface of the molten mass is covered by a non-oxidizing, preferably a reducing atmosphere.

13 Claims, 1 Drawing Sheet

MAGNESIUM TREATMENT PROCESS AND APPARATUS FOR CARRYING OUT THIS PROCESS

BACKGROUND OF THE INVENTION

The present invention concerns a magnesium treatment process for the production of a treated molten mass with less than 100 grams per ton of non-metallic inclusions, and an apparatus for carrying out this process.

It is known to treat a molten iron mass with magnesium with the object of influencing the graphite morphology in such a way that spheroidal graphite is formed. In such a process fairly large quantities of non-metallic compounds occur, for example oxides, sulphides and similar. This effect is a result of the high affinity of the magnesium for oxygen and sulphur.

The non-metallic reaction products are mostly eliminated during the treatment of the molten iron mass, or in the time interval between the end of treatment and decantation, as a result of the differences between the density of the slag particles (approximately 3,000 kg/m$^3$) and the molten mass (approximately 7,000 kg/m$^3$). However, a portion of the reaction products, particularly particles smaller than 12.5 μm, still remains in suspension in the molten mass, even after the usual time available.

The flotation speed can be determined with relatively good precision by Stokes' equation.

$$L = \frac{d^2 \times (\delta Fe - \delta - \text{slag}) \times g \times t \times 10^{-9}}{18 \times \mu}$$

where:
- L = Flotation height in mm
- d = Particle size in um
- δFe = Density of iron in Kg/m$^3$ (7,000)
- δslag = Density of slag in Kg/m$^3$ (3,000)
- t = Flotation time in seconds
- μ = Dynamic viscosity (0.007)

Practical measurements showed that, with conventional treatment processes, the quantity of particles in suspension is between 200 and 600 grams per ton of treated iron, and this quantity is then poured with the pouring stream into the casting mold. The tests also showed that these inclusions, which remain in the casting, can substantially reduce the dynamic properties of the casting.

In order to enable the flotation of the reaction products the molten mass would have to be left to stand in the pan for a lengthy period. However, this would lead to considerable, generally unacceptable temperature losses (6°-15° C. per minute).

The use of the process, known from steel production, of rinsing the molten mass with inert gas (N, Ar, etc.), causes an increased oxidation of the magnesium, and this leads to the formation of further, new inclusions, which means that the desired object cannot be achieved with this process.

SUMMARY OF THE INVENTION

It is highly desirable to provide a process and an apparatus by way of which the treatment reaction can be controlled so that the non-metallic inclusions in the treated molten mass can be reduced to a minimum.

DETAILED DESCRIPTION

Figure 1:
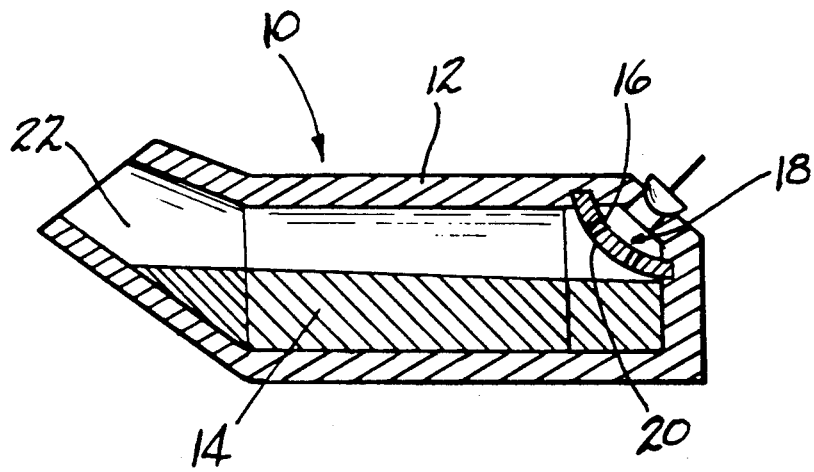
FIG. 1 illustrates the apparatus of the present invention in one operative position.

The foregoing object is achieved by way of the present invention by providing a process for the treatment of an iron melt with magnesium, including the following steps: providing an iron melt in a treatment container; providing a non-oxidizing atmosphere above the surface of the molten mass in the treatment container; and introducing magnesium into the melt at a depth of at least 200 mm below the surface of the molten mass in an amount such that the quantity of vaporized magnesium produces a mixing energy of at least 1,000 W/m$^3$. The magnesium may be in the form of lumps or granules. In addition, the magnesium may be provided in the form of a mixture of pure magnesium in either lumps or granules with a reaction-neutral substance wherein the total mixture is at least 40% by weight magnesium. In accordance with a preferred embodiment of the present invention, the reaction-neutral substance comprises iron filings. The process of the present invention is preferably carried out at a temperature of between 1450° C. to 1530° C. The initial melt being treated generally has a sulphur content of between 0.001 and 0.300% by weight sulphur. The resulting treatment slag has a basicity of greater than 1%.

Likewise according to another aspect of the invention, there is provided an apparatus 10 for the treatment of an iron melt with magnesium, comprising a reaction container 12 for containing the melt 14 and having a partition 16 defining a reaction chamber 18 separated from the melt wherein the partition 16 is provided with at least two openings 20 by means of which the connection between the reaction space and the molten mass can be produced, and the container is so shaped that, in use, the level of the melt 14 during the reaction is at least 200 mm above the level of the connecting openings 20.

By the controlled rinsing of the molten mass in a non-oxidizing, preferably a reducing atmosphere, the reaction products occurring during treatment are already coagulated during the magnesium treatment, and are transported as slag to the surface of the molten mass by the rising magnesium vapor bubbles. The coagulation of the reaction products is brought about by the quantity of vapor occurring and by the mixing energy. Experiments show that the intensity of the coagulation is substantially increased by collision of the non-metallic particles at the time of their formation, that is to say, at the place of the reaction. The mixing energy can be determined by the following equation:

$$E = \frac{6.2 \times 10^{-3} \times Q \times T(1 - 273/T) \times \ln p/pO}{V}$$

- E = Mixing energy in W/m$^3$
- Q = Quantity of gas in Nl/min. (Nl = normalized liter)
- T = Temperature in °K
- pO = Pressure on the surface of the molten mass in atm.
- p = pO + ferrostatic pressure in atm.
- V = Volume of the molten mass in M$^3$ The practical tests showed that the quantity of non-metallic inclusions in the melt can be reduced to values of below 100 grams per ton, if the mixing energy is greater than 1,000 W/m³, the magnesium vapors occur at a depth of at least 200 mm below the surface of the melt, and the atmosphere above the molten mass is supersaturated with magnesium vapor.

This is explained in the following with reference to an example:

EXAMPLE

Figure 2:
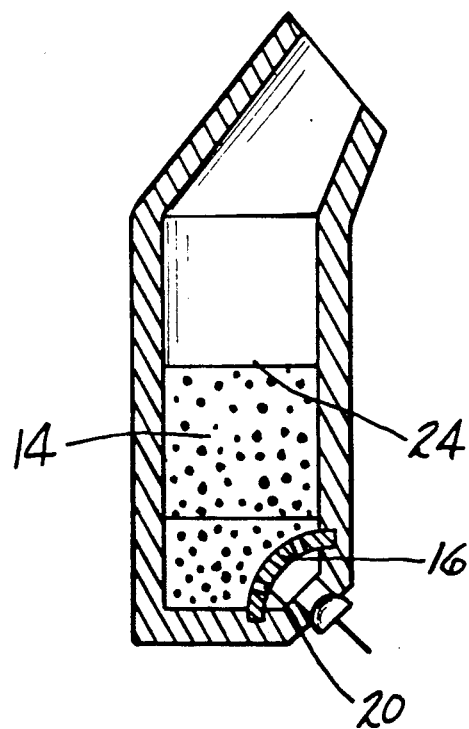
FIG. 2 illustrates the apparatus of the present invention in another operative position.

An iron melt 1 with the alloyed composition
C = 3.72%
Si = 2.3%
Mn = 0.27%
S = 0.08%
P = 0.05%
was treated with pure magnesium in a closed treatment container (converter) 12 with a fill opening 22 of 30 cm², as shown in FIGS. 1 and 2. The converter 12 includes a reaction chamber 18 defined by a partition 16 in a corner which initially, as shown in FIG. 1, lies above the surface 24 of the melt 14. The partition 16 has four reaction openings 20, connecting the reaction chamber 18 with the melt chamber, with a total cross-section of 1250 mm. Following tipping of the converter 12, as shown in FIG. 2, to initiate the reaction, a sample was removed after a reaction time of 60 seconds. The analysis showed 3 ppm oxygen and 50 ppm sulphur. A quantity of 20 grams per ton of non-metallic inclusions was calculated. The quantitive metallographic analysis showed a quanity of non-metallic inclusions of 23 grams per ton.

The surface 24 of the melt 14 during the reaction is at least 200 mm above the highest opening 20 so that the magnesium vapor produces sufficient reaction energy and agitation of the melt to reduce the quantity of non-metallic inclusions in the resulting melt to below 100 grams per ton. The level of the surface 24 is determined basically by the quantity of iron that can be poured in the preliminary stage (FIG. 1) so as not to impinge upon the reaction chamber 18.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for the treatment of an iron melt with magnesium, including the following steps:
   providing an iron melt in a treatment container;
   providing a non-oxidizing atmosphere above the surface of the molten mass in the treatment container; and
   introducing particulate magnesium into the melt at a depth of at least 200 mm below the surface of the molten mass in an amount such that the quantity of vaporized magnesium produces a mixing energy of at least 1,000 W/m³ wherein reaction products occurring during treatment are transported as slag to the surface of the molten mass by rising magnesium vapor bubbles thereby reducing the quantity of non-metallic inclusions in the melt to below 100 grams per ton of treated molten mass.

2. A process according to claim 1 wherein the magnesium is provided in the form of lumps.

3. A process according to claim 1 wherein the magnesium is provided in the form of granules.

4. A process according to claim 1 wherein the magnesium is provided in the form of a mixture of pure magnesium granules and a reaction-neutral substance, with at least 40% by weight magnesium.

5. A process according to claim 4 wherein the reaction-neutral substance comprises iron filings.

6. A process according to claim 1 wherein the recovery of magnesium is not greater than approximately 75%.

7. A process according to claim 1 wherein the initial melt has a sulphur content of between 0.001 and 0.30% by weight.

8. A process according to claim 1 wherein the treatment temperature is set at between 1,400° C. and 1,530° C.

9. A process according to claim 1 wherein the basicity of the treatment slag is greater than 1.

10. An apparatus for the treatment of an iron melt with particulate magnesium, comprising a reaction container for containing the melt and having a partition defining a reaction chamber and a melt chamber, in which the partition is provided with at least two openings by means of which the connection between the reaction chamber and the melt chamber can be produced, and the container is so shaped that, in use, the level of the melt during the reaction is at least 200 mm above the level of the connecting openings wherein reaction products occurring during treatment are transported as slag to the surface of the molten mass by rising magnesium vapor bubbles thereby reducing the quantity of non-metallic inclusions in the melt to below 100 grams per ton of treated molten mass.

11. An apparatus according to claim 10 wherein the connecting openings have a total cross-section of at least 500 mm².

12. An apparatus according to claim 10 wherein the reaction container is provided with an opening which produces a connection from the surface of the melt to the surrounding atmosphere and which, at the same time, ensures an excess pressure of magnesium vapor at the surface of the melt of at least 0.01 bar.

13. An apparatus according to claim 12 wherein the reaction chamber opening has a cross-section of about 30 cm².

* * * * *